United States Patent [19]
Kight

[11] Patent Number: 5,370,312
[45] Date of Patent: Dec. 6, 1994

[54] GAS TURBINE ENGINE EXHAUST NOZZLE
[75] Inventor: Mathew S. Kight, Palm City, Fla.
[73] Assignee: United Technologies Corporation, Hartford, Conn.
[21] Appl. No.: 91,692
[22] Filed: Jul. 13, 1993
[51] Int. Cl.5 .................. B64C 15/00; F16L 27/04
[52] U.S. Cl. .................. 239/265.19; 60/232; 285/267
[58] Field of Search .......... 239/265.11, 265.19, 239/265.33, 265.35, 587.4; 60/228, 230, 232; 285/267, 279

[56] References Cited
U.S. PATENT DOCUMENTS

| | | | |
|---|---|---|---|
| 1,615,774 | 6/1927 | Russell | 285/267 X |
| 3,811,713 | 5/1974 | Barrett et al. | 239/265.19 X |
| 3,877,646 | 4/1975 | McCullough | 239/265.19 |
| 3,961,815 | 6/1976 | Coulboy et al. | 285/267 X |
| 4,012,060 | 3/1977 | Reneau | 285/267 X |
| 4,836,451 | 6/1989 | Herrick et al. | 239/265.27 |
| 4,993,641 | 2/1991 | Kehret et al. | 239/127.3 |

Primary Examiner—Andres Kashnikow
Assistant Examiner—Kevin P. Weldon
Attorney, Agent, or Firm—Edward L. Kochey, Jr.

[57] ABSTRACT

The spherical portions of two gimbal (18) mounted convergent flaps (26,28) have hub structures (24) of concentric hubs (54,56). A piston (38) within each hub carries an annular seal (36) which is urged into sealing contact with the spherical static structure (10).

The hub communicates air to a plenum between the convergent flaps to cool the convergent flaps.

11 Claims, 3 Drawing Sheets

GAS TURBINE ENGINE EXHAUST NOZZLE

The Government has rights in this invention, pursuant to Contract No. F33657-88-C-2085 awarded by the Department of the Air Force.

TECHNICAL FIELD

The invention relates to vectorable exhaust nozzles for an aircraft gas turbine engine using a gimbaled arrangement, and in particular to a hub seal therefore.

BACKGROUND OF THE INVENTION

Variable area convergent/divergent nozzles are used in aircraft gas turbine engines to achieve optimum performance over a wide power range, including afterburning. The discharge nozzle may be vectorable to change the direction of the exhaust gas. Vertical variation will provide pitch control while horizontal variation provides yaw control.

A spherical exhaust nozzle of such capability is shown in U.S. Pat. No. 4,993,641 issued Feb. 19, 1991 to Debora Kehret et al. Static structure conveying the turbine exhaust from the afterburner has a spherical outer surface and an aft opening for the discharge of the gas. Two convergent flaps restrict the gas discharge. The upstream end of each flap surrounds the static structure with the flap having a spherical inside surface.

A seal is required between the static structure and the convergent nozzle. This prevents leakage of the discharge gas outwardly. If cooling air is introduced between the convergent nozzle and the static structure, excess leakage into the turbine exhaust products is avoided. This seal will permit direction of such cooling air into and through the convergent nozzles for cooling thereof.

Brush seals may be used to seal between the two spherical surfaces. FIG. 5 of the above mentioned U.S. Pat. No. 4,993,641 shows a prior art hub structure with a deep narrow annular groove in the hub area. A simple metal ring was located in this groove and held against the static structure with a wave washer. This arrangement leaked badly and caused excessive wear. The seal did not easily follow surface variations.

SUMMARY OF THE INVENTION

A static collar has a spherical outer surface and a gimbal ring secured thereto around a vertical axis. Secured to a horizontal axis on the gimbal ring is a first and second convergent flap each having a spherical portion surrounding a portion of the static collar. A hub structure formed of a hub from each flap is located on opposites sides of the static collar.

A brush seal extends circumferentially from one hub structure to the other at a location between the static collar in each flap. A piston is located concentrically within each hub structure carrying an annular seal ring which completes the circumferential seal in combination with the brush seals. The seal ring carry on the piston is biased against the spherical outer surface of the static structure.

The piston is biased with belville washers and each piston has grippable means for withdrawing the piston against the force of the washers. This facilitates installation of the structure.

A peripheral seal ring around some portion of the piston seals against leakage which would pass through any opening on the grippable means. The annular ring preferably comprises a graphite seal.

Each hub structure comprises a male hub and a concentric female hub. The convergent flaps may be hollow with a plenum between an inner and outer surface with this plenum being in fluid communication with an incoming air chamber through the hub.

DESCRIPTION OF THE PREFERRED EMBODIMENT

Figure 1:
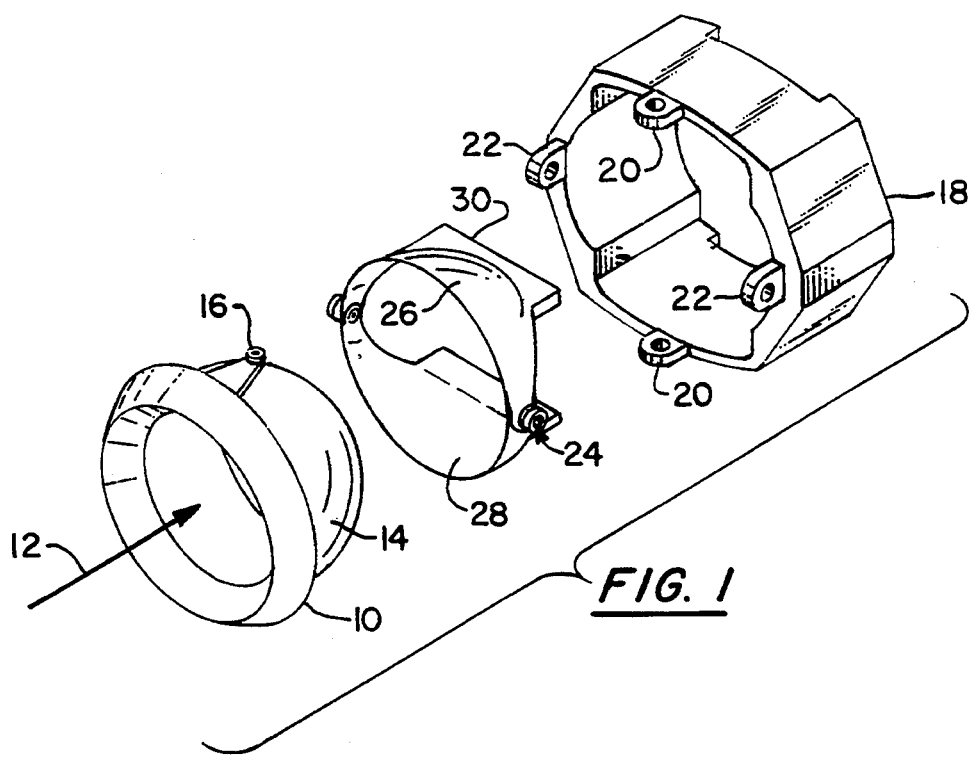
FIG. 1 is an exploded view showing the static structure, the gimbal ring and the convergent flaps.
Figure 2:
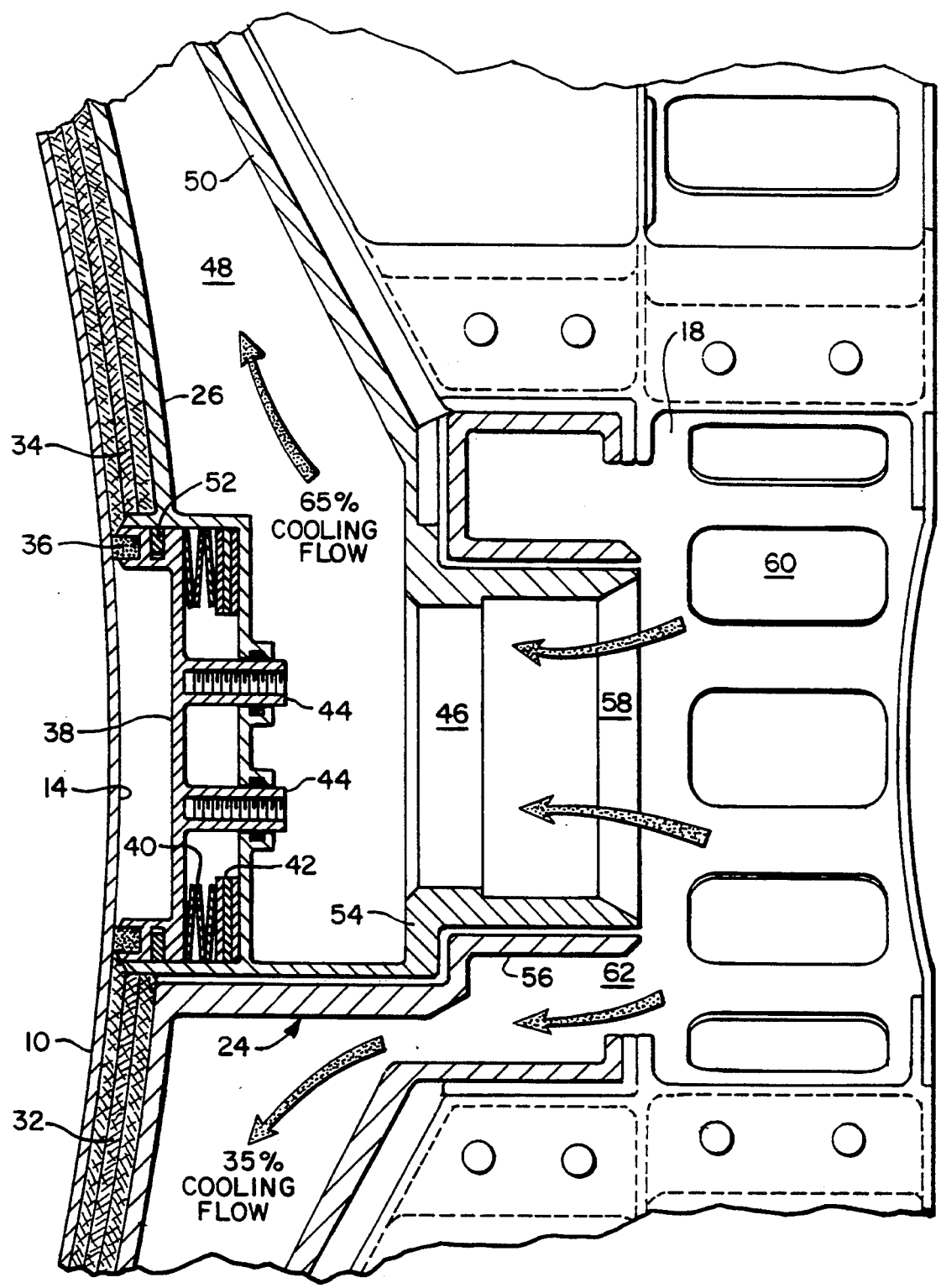
FIG. 2 is a sectional view of the hub area while sealing during operation.

Referring to FIG. 1 a static structure 10 conveys gas turbine exhaust products 12. This structure has a spherical outer surface 14 and yaw bearings 16 located on a vertical axis. A gimbal ring 18 has bearing receivers 20 which cooperate with bearings 16 to permit the yaw structure to yaw around the static structure.

The yaw structure also has bearing receivers 22 on a horizontal axis which engage hubs 24 of the upper convergent flap 26 and the lower convergent flap 28. Each of these flaps carry bills 30 which are connected to divergent flaps (not shown).

It can be seen that in addition to rotation of the various portions of the hub structure 24, the hub structure itself will move around the surface of static structure 10 in response to pivoting around your bearing 16. The seal is required between the spherical surface 14 on the outside of the static structure and the inside surfaces of convection flaps 26 and 28. For this purpose there is secured to the convergent flaps 24 and 26 brush seals 32 and 34.

The circumferential seal is completed by a graphite annular seal ring 36 carried on piston 38. Belville washers 40 with separators 42 function to urge the piston and the seals against the surface 14 of the static structure. Couplings or bosses 44 are supplied for the purpose of retracting the piston, this being described later with respect to FIG. 3.

Cooling air in plenum 46 is intended to pass through plenum 48 between the inner spherical portion 26 of the convergent flap and an outer spherical portion 50 of the flap. A seal ring 52 in the nature of a split piston ring functions as a peripheral seal ring around the periphery of the piston. This prevents excessive leakage of air from the plenum 46 directly into the gas flow path. Alternatively this peripheral seal could be located around each of the couplings 44.

Each hub structure 24 is comprised of a male hub 54 and a female hub 56. An opening 58 through the male hub 54 is in fluid communication with plenum 48 permitting cooling air to flow into and through the convergent flap 26 from supply chamber 60. An opening 62 in the female hub permits cooling air to flow through the other convergent flap. On the opposing side there is another hub and the flap carrying the male hub on one side carries the female hub on the other side and vise versa. Accordingly the two may be slid together for assembly and once assembled in placed within the nozzle structure they will remain appropriately assembled.

Preferably the inlets 58 and 62 are sized so that 65% of the cooling air flow passes through the male hub on each side with 35% flowing through the female hub.

Figure 3:
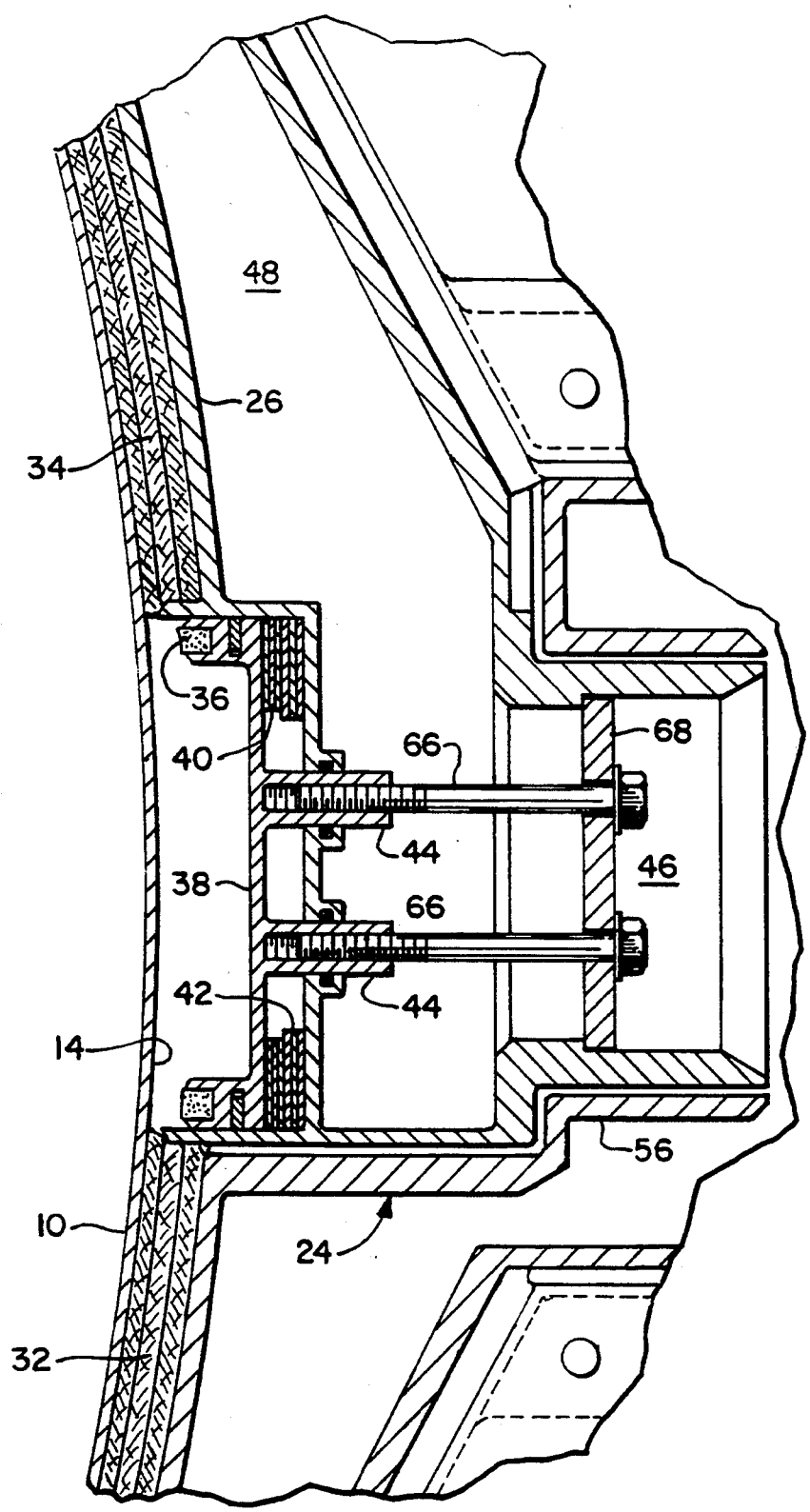
FIG. 3 is a sectional view of the hub area while retracted for installation.

FIG. 3 illustrates the use of retraction bolts 66 operating against retraction plates 68 for withdrawing the piston 38 against the biasing means or Belville washers 40. This withdraws seals 36 from contact with the outer spherical surface 14 of the stationary member. Assembly and disassembly without damage to the seals is thereby facilitated.

I claim:

1. In a vectorable exhaust nozzle for an aircraft gas turbine engine;
   a static collar having a spherical outer surface;
   a first convergent flap having a spherical portion surrounding an upper portion of said static collar;
   a second convergent flap having a spherical portion surrounding a lower portion of said static collar;
   two hub structures, each one on opposite sides of said static collar, each having a common first axis and comprised of a first convergent flap hub and a second convergent flap hub;
   a first seal between said first flap and said static collar circumferentially extending from one hub structure to the other hub structure;
   a second seal between said second flap and said static collar circumferentially extending from one hub structure to the other hub structure;
   two pistons, each piston located concentrically with each said hub structure;
   an annular seal ring carried on each piston and bearing against said spherical outer surface, at a location adjacent said first and second seals; and
   biasing means between each piston and one flap for urging said annular seal against said outer surface.

2. An apparatus as in claim 1 further comprising:
   each of said biasing means comprising at least one belville washer.

3. An apparatus as in claim 1 further comprising:
   each of said pistons having grippable means for withdrawing said piston against said biasing means.

4. An apparatus as in claim 3 wherein: said grippable means comprises threaded couplings.

5. An apparatus as in claim 3 further comprising:
   a peripheral seal ring around the periphery of some portion of said piston for sealing and sliding contact with said convergent flap.

6. An apparatus as in claim 1 wherein:
   said annular ring comprises a graphite seal.

7. An apparatus as in claim 1 further comprising:
   a gimbal ring surrounding said static structure and having a vertical axis of rotation with respect to said static structure; and
   said hub structure secured to said gimbal ring with said common axis comprising a horizontal axis.

8. An apparatus as in claim 7 wherein:
   each hub structure comprises a male hub and a concentric female hub.

9. An apparatus as in claim 7 wherein:
   said first seal and said second seal each comprises a brush seal.

10. An apparatus as in claim 9 further comprising:
    each of said brush seals secured to said convergent flap and sliding against said spherical outer surface.

11. An apparatus as in claim 9 further comprising:
    each convergent flap having an outer spherical portion surrounding said spherical portion forming a plenum therebetween; and
    an opening through said male hub in fluid communication with said plenum with the passage of cooling air therethrough.

* * * * *